March 12, 1968   B. GILBERT   3,372,684
SPARK IGNITION SYSTEMS

Filed March 9, 1966                                     2 Sheets-Sheet 1

United States Patent Office

3,372,684
Patented Mar. 12, 1968

3,372,684
SPARK IGNITION SYSTEMS
Brian Gilbert, Sutton Coldfield, England, assignor to Joseph Lucas (Industries) Limited, Birmingham, England
Filed Mar. 9, 1966, Ser. No. 532,971
Claims priority, application Great Britain, Mar. 11, 1965, 10,331/65
1 Claim. (Cl. 123—148)

ABSTRACT OF THE DISCLOSURE

In a spark ignition system, switch means is driven by the engine and when closed permits energy to be stored in an inductor. When the switch means is open, the energy is transferred from the inductor to a capacitor, and then a controlled rectifier is turned on to permit discharge of the capacitor through the controlled rectifier, this discharge producing a spark. The spark is produced while the switch means is still open, and the circuit is so arranged that when the switch means closes again, the anode of the controlled rectifier will be connected to the negative terminal of a D.C. source, so ensuring that the controlled rectifier is reverse biased and turned off.

---

This invention relates to spark ignition systems for internal combustion engines.

A spark ignition system according to the invention includes first and second terminals which in use are connected to a D.C. source, an inductor connected in a series circuit between said terminals, the series circuit including switch means which is turned on and off in timed relationship with the engine and which when closed permits energy to be stored in said inductor, and when open allows the energy stored in said inductor to be transferred to a capacitor, means operable when the capacitor is charged for firing a controlled rectifier to provide a discharge path for the capacitor, discharge of the capacitor through the controlled rectifier producing a spark, and the controlled rectifier being connected in the circuit in such a manner that when the switch means is closed the controlled rectifier is reverse biased.

In the accompanying drawings, FIGURES 1 to 4 are circuit diagrams illustrating four examples of the invention.

Figure 1:
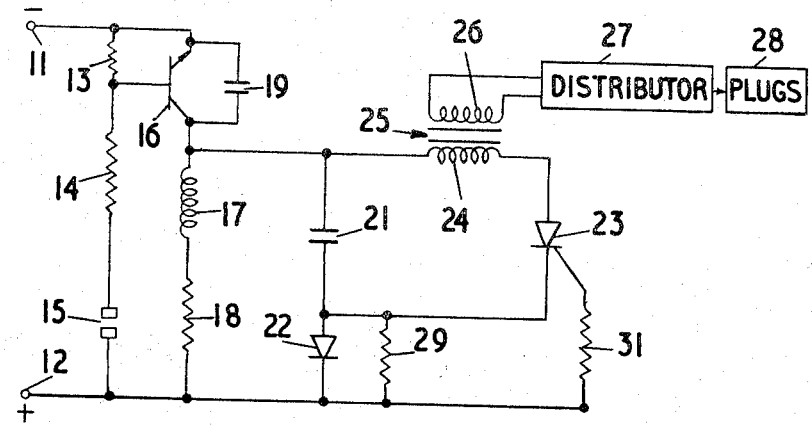

Referring to FIGURE 1, there are provided terminals 11, 12 which in use are connected to a D.C. source so as to be negative and positive in polarity respectively. The terminals are interconnected through a series circuit including resistors 13, 14 and an interruptor 15 which is driven by the engine. A point intermediate the resistors 13, 14 is connected to the base of a transistor 16, the emitter of which is connected to the terminal 11, and the collector of which is connected to the terminal 12 through an inductor 17 in series with a resistor 18. The collector and emitter of the transistor are bridged by a capacitor 19.

The collector of the transistor 16 is connected to the terminal 12 through a capacitor 21 in series with a diode 22, and is also connected to the anode of a controlled rectifier 23 through the primary winding 24 of an ignition transformer 25 the secondary winding 26 of which is connected through a distributor 27 to the spark plugs 28 of the engine in turn. The cathode of the rectifier 23 is connected to the terminal 12 through the diode 22 and a resistor 29 in parallel and the gate of the rectifier 23 is connected to the terminal 12 through a resistor 31.

In use, when the interruptor 15 closes the transistor 16 can conduct, and the rectifier 23 is reverse biased so that it cannot conduct. Current flows through the transistor 16 to the inductor 17, so that energy is stored in the inductor. When the interruptor 15 opens, the transistor 16 ceases to conduct, and current flows from the inductor 17 through the capacitor 21 and diode 22 so that the capacitor 21 is charged. While the capacitor 21 is being charged, the voltage drop across the diode 22 maintains the gate of the rectifier 23 negative with respect to its cathode, so that the rectifier 23 cannot conduct. However, when the capacitor 21 is charged to its peak voltage, current begins to flow from the capacitor 21 back into the inductor 17, and so the diode 22 becomes reverse biased, at which point current is diverted through the resistor 31 and the gate and cathode of the rectifier 23, so that the rectifier 23 is caused to conduct. The capacitor 21 now discharges through the winding 24 and the anode and cathode of the rectifier 23, and the high voltage induced in the winding 26 produces the required spark. For many practical purposes, the spark can be considered to be produced instantaneously when the interruptor 15 opens if it occurs not later than 100 microseconds after the interruptor opens.

The capacitor 19 has a capacitance which is small compared with that of capacitor 21 and is included to allow for energy stored in any stray inductance in the circuit, and to absorb any transients when the spark is produced. The resistor 18 can in some circuits be constituted by the resistance of the inductor 17 itself, and the resistor 29 is preferably included to ensure that the capacitor 21 is completely discharged at the end of each cycle.

Although in FIGURE 1 the transistor 16 is controlled by an interruptor 15, it will be appreciated that it can be controlled by any device operated by the engine. For example, the interruptor 15 could be a semi-conductor switch controlled by pulses from a magnetic generator operated by the engine.

It will be appreciated that at the end of a cycle when the interruptor 15 closes again, conduction of the transistor 16 reverse biases the rectifier 23, so that there is no danger of the rectifier 23 continuing to conduct.

The core of the inductor 17 may be designed to saturate or start to saturate when the current exceeds a predetermined value to prevent generation of excessive voltages. Alternatively, or in addition, a resistor with a large positive temperature co-efficient can be connected in series with the inductor 17.

Figure 2:
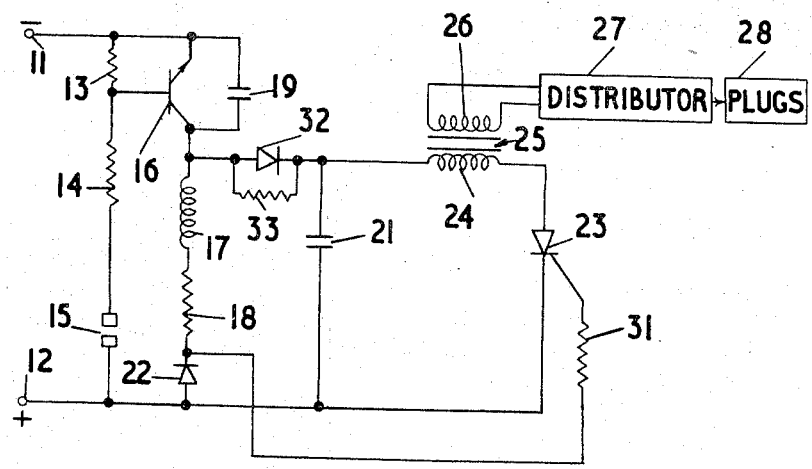

FIGURE 2 shows two separate modifications of the example shown in FIGURE 1. Firstly, the diode 22 is repositioned in the series circuit including the inductor 17 and resistor 18, and secondly the winding 24 and capacitor 21 are connected to the collector of the transistor 16 through a diode 32 and resistor 33 in parallel.

Ignoring for the moment the diode 32 and resistor 33, the circuit operates in much the same way as FIGURE 1. However, in FIGURE 1, when the transistor 16 is switched off, there is a slight delay before the inductor 17 discharges its energy into the capacitor 21, because the diode 22 is not conducting when the transistor 16 is switched off. In FIGURE 1, this delay is allowed for by the capacitor 19. In FIGURE 2, however, the diode 22 is conducting when the transistor 16 is switched off, so there is no delay in transferring the energy from the inductor 17 to the capacitor 21. Moreover, in FIGURE 2, in the event of an accidental reclosure or breakdown on the interruptor 15 before the capacitor 21 is fully charged, the controlled rectifier 23 will not be triggered because the diode 22 will continue to conduct, so maintaining the negative bias on the gate of the rectifier 23. In FIGURE 1, accidental reclosure may reverse bias the diode 22 and cause the rectifier 23 to conduct before there is sufficient charge on the capacitor 21 to produce the spark, and the rectifier 23 may still be conducting when the contacts finally separate so that there can be no further build up of voltage on the capacitor 21. In FIGURE 2 (still ignoring the diode 32 and resistor 33), the energy stored in the capacitor 21 is lost by discharge through the transistor 16 in the event of accidental reclosure, but the residual energy stored in the inductor 17 is still available to produce the spark when the interruptor 15 opens properly.

In order to prevent the capacitor 21 from discharging through the transistor 16 in the event of accidental reclosure, the diode 32 can be included, and in this case the connection from the gate of the rectifier 23 is preferably made to a point intermediate the resistor 18 and inductor 17. The rectifier 23 is now switched on when the capacitor 19 reaches its peak voltage and commences to discharge back into the inductor 17. However, since the capacitors 19, 21 reach their peak voltage at substantially the same time, the timing of the circuit is not impaired. It will be appreciated that accidental reclosure now results only in the loss of energy from the capacitor 19, which is relatively unimportant.

The diode 32 has the additional advantage that it prevents damage to the transistor 16 which might result from the discharge of the capacitor 21 through the transistor 16.

In some cases the rectifier 23 may be sufficiently sensitive for switching on to occur without the assistance of the capacitor 19, as a result of the self-capacitance of the diode 32.

The resistor 33 in FIGURE 2 takes the place of the resistor 29 in FIGURE 1.

Figure 3:
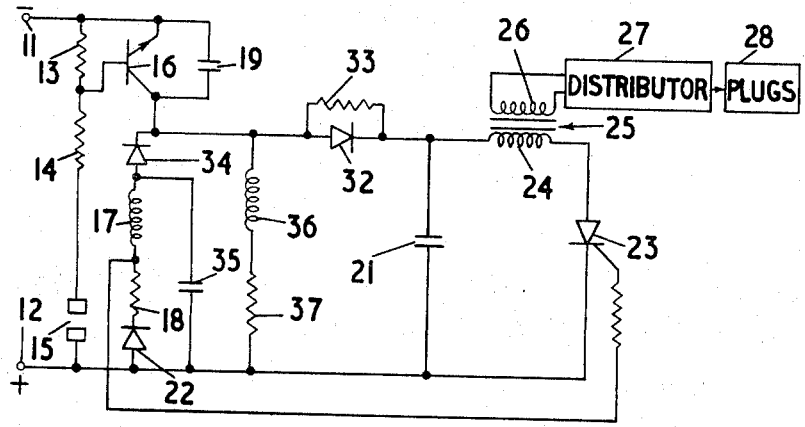

Referring now to FIGURE 3, the circuit shown in FIGURE 2 has been modified by the inclusion of a diode 34 between the inductor 17 and the collector of the transistor 16, and a capacitor 35 connected across the inductor 17, resistor 18 and diode 22. In addition, the collector of the transistor 16 is connected to the terminal 12 through an inductor 36 in series with the resistor 37.

FIGURE 3 is particularly useful when the circuit is required to operate on low battery voltages. In FIGURE 2, the inclusion of the diode 22 in series with the storage inductor 17 not only results in unnecessary power loss, but the extra voltage drop across the diode 22 makes it more difficult to obtain satisfactory performance when the battery voltage is very low. In FIGURE 3, the firing circuit for the rectifier 23 has been separated from the storage inductor, which in this case is of course constituted by the inductor 36. In use, when the interrupter 15 closes and the transistor 16 conducts, energy is stored in the main inductor 36 and also in the inductor 17 which conveniently carries quite a small current. When the interruptor 15 opens again, the inductor 36 transfers its charge to the capacitor 21, and the inductor 17 transfers its charge to the capacitor 35. The diode 34 prevents the inductor 36 from charging the capacitor 35. When the capacitor 35 is charged to its peak voltage, which may be much lower than the voltage level in the capacitor 21, it starts to discharge back into the inductor 17, and the diode 22 becomes reverse biased as before so that the controlled rectifier 23 is fired, and the capacitor 21 discharges to produce the spark.

The circuit parameters can be chosen so that the capacitor 35 reaches its peak voltage at the same time as the capacitor 21, or before or after the capacitor 21 as desired. If the controlled rectifier 23 is fired before the capacitor 21 is fully charged and if the capacitor discharge is oscillatory, it is possible to obtain more than one spark for each operation of the interruptor, and this feature is useful for some applications. It is possible that in some circumstances where it is desired to obtain more than one spark, the rectifier 23 will not be switched off properly by the oscillating current when the capacitor 21 discharges, but this will not be serious. It would of course be serious if a spark was missed altogether because the rectifier 23 was not switched off properly, but this cannot happen with the arrangement shown because the rectifier 23 is reverse biased when the transistor 16 conducts. It will be appreciated that in both FIGURE 2 and FIGURE 3, the resistor 33 provides a path for reverse biasing the rectifier 23 as well as ensuring complete discharge of the capacitor 21.

Figure 4:
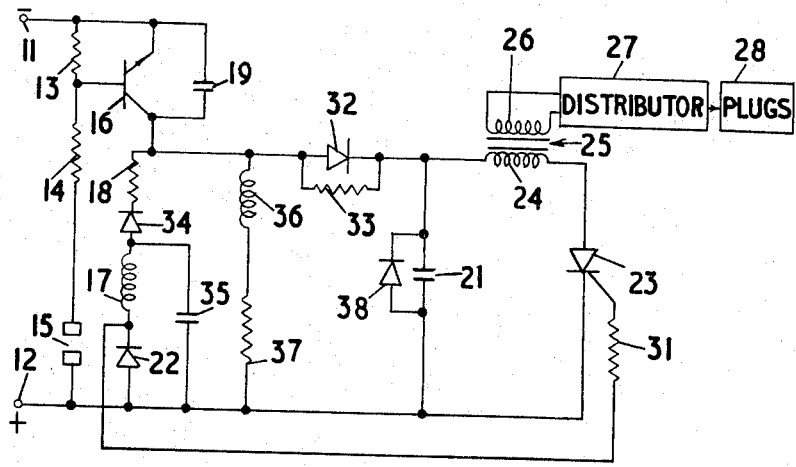

In the modified form of FIGURE 3 shown in FIGURE 4, the inductor 17 and capacitor 35 are chosen so that the capacitor 21 discharges before it reaches its peak voltage. Moreover, the resistor 18 is re-positioned between the cathode of the diode 34 and the collector of the transistor 16, so that the capacitor 35 does not discharge immediately when the controlled rectifier 23 switches on, but is able to maintain a positive drive to the gate of the controlled rectifier for a predetermined period of time. In addition a diode 38 is connected across the capacitor 21. With this arrangement, the rectifier 23 continues to conduct after it has been fired until either the residual inductive energy in the inductor 36 is dissipated, or the transistor 16 is switched on. At low engine speed, the energy in the inductor 36 will be dissipated before the transistor 16 is switched on, and the circuit will operate in the same way as FIGURE 3. However, at high engine speeds appreciably residual current will still be flowing in inductor 36 when the transistor is switched on again. The final current attained in this inductor during the succeeding period of transistor conduction will be higher, approximately by this amount, than it otherwise would have been. Since the energy stored in the inductor is proportional to the square of the current in it, it will be appreciated that quite a low residual energy will result in a much higher increase in peak energy stored and therefore an overall increase in energy available for the spark. In this way higher sparking speeds are obtainable than would be possible otherwise. The diode 38 also protects the emitter-base junction of the transistor 16 from the reverse voltage which may be developed on capacitor 21 in the absence of this diode.

In a further modification of any of the examples shown, the transistor 16 is replaced by the interruptor 15 itself.

In all the examples shown the storage inductor is connected directly to the storage capacitor, but in a modification the coupling is indirect by way of a transformer the primary winding of which is constituted by the storage inductor. In one such arrangement for producing sparks at a low voltage plug, the secondary winding of the transformer has one end connected through the plug to the anode of the rectifier 23, the cathode of which is connected to the other end of the secondary winding through the diode 22. The capacitor 21 is connected across the secondary winding in series with the diode 22, the cathode of which is connected to the gate of the rectifier 23. The diode 22 and the plug are bridged by resistors, and the operation is similar to the circuits described above. It should be noted that the rectifier 23 is still reverse biased through the transformer when the transistor 16 conducts.

It will be noted that if the transistor 16 is turned on while the rectifier 23 is still conducting, there will be a delay before the rectifier 23 is reverse biased as a result of inductance in the circuit. In the case of FIGURE 4, a delay of predetermined length can be introduced deliberately to reduce the risk of production of a spark as a result of accidental closure of the contacts 15.

Having thus described my invention what I claim as new and desire to secure by Letters Patent is:

1. A spark ignition system for an internal combustion engine, comprising in combination:
   (a) a D.C. source having positive and negative terminals a series circuit connected across said D.C. source and including switch means which is turned on and off in timed relationship to the engine and an inductor in which energy is stored when the switch means is closed
   (b) first and second supply lines
   (c) means coupling said first and second supply lines to said negative and positive terminals respectively when said switch means is closed whereby said first and second supply lines are negative and positive in polarity respectively when said switch means is closed (d) a controlled rectifier connected in series with spark producing means between said first and second supply lines with the anode and cathode of the controlled rectifier connected to the first and second supply lines respectively whereby said controlled rectifier is reverse biased when said switch means is closed (e) a capacitor connected across said controlled rectifier and spark producing means (f) means transferring energy from said inductor to said capacitor when said switch means opens whereby said capacitor is charged.

(g) means operable while said switch means is still open for turning said controlled rectifier on to permit discharge of said capacitor through said controlled rectifier and said spark producing means to produce a spark.

References Cited
UNITED STATES PATENTS

| | | | |
|---|---|---|---|
| 2,899,632 | 8/1959 | Lawson | 323—58 |
| 3,150,286 | 9/1964 | Quinn. | |
| 3,263,124 | 7/1966 | Stuermer. | |
| 3,318,295 | 5/1967 | Byles. | |

LAURENCE M. GOODRIDGE, *Primary Examiner.*